Feb. 25, 1930. F. L. JOHNSTON 1,748,773
GRADUATED MAGNETIC CONTROL OF BRAKES OR CLUTCHES
Filed April 7, 1926  2 Sheets-Sheet 1
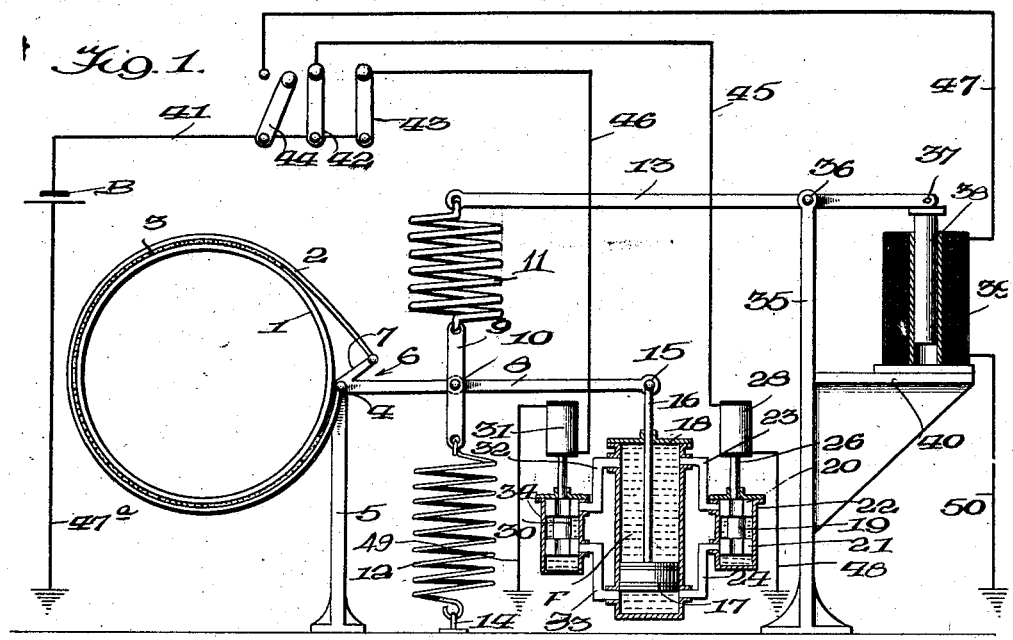
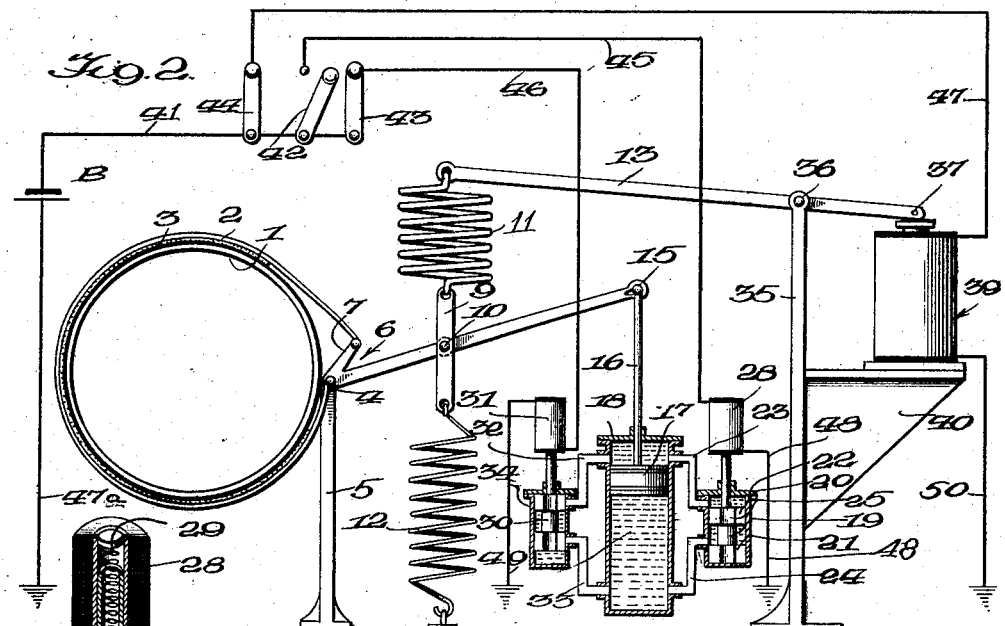
INVENTOR
F. L. JOHNSTON,
BY
ATTORNEYS Feb. 25, 1930.  F. L. JOHNSTON  1,748,773
GRADUATED MAGNETIC CONTROL OF BRAKES OR CLUTCHES
Filed April 7, 1926  2 Sheets-Sheet 2
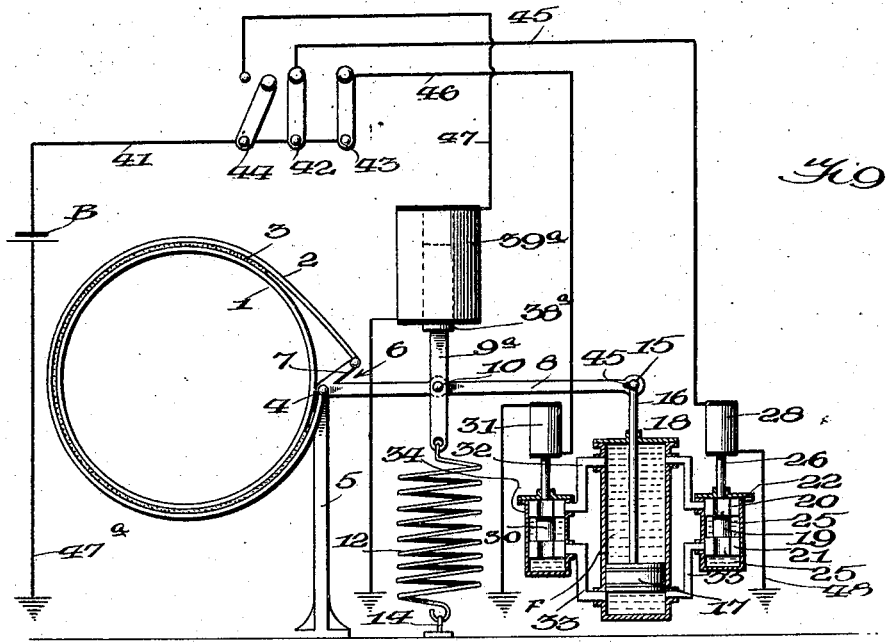
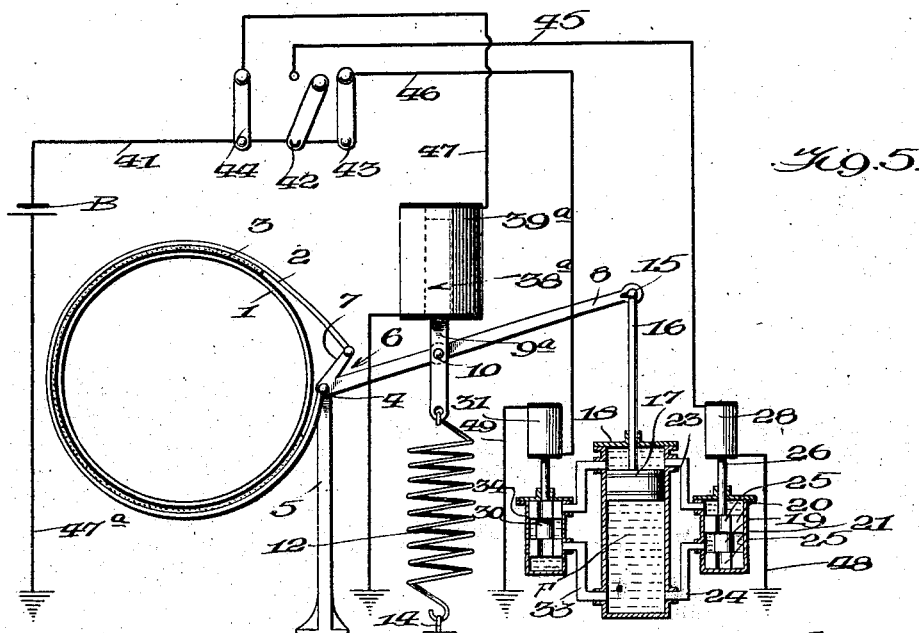
INVENTOR,
F. L. JOHNSTON,
BY
ATTORNEYS Patented Feb. 25, 1930

1,748,773

UNITED STATES PATENT OFFICE

FRANK L. JOHNSTON, OF EVERETT, MASSACHUSETTS

GRADUATED MAGNETIC CONTROL OF BRAKES OR CLUTCHES

Application filed April 7, 1926. Serial No. 100,433.

This invention relates to improvements in brake mechanism, and an object thereof is to provide means for controlling the same, one of the important purposes being to apply the brake either gradually or quickly and to hold the brake to any degree of application. While I show and describe a brake as being the operative object; the invention is equally applicable to other installations, such as clutches, where similar control is necessary or desirable.

Another object of the invention is to combine electromagnetically and fluid operated means in effecting the foregoing control.

Other objects and advantages will appear in the following specification, reference being had to the accompanying drawings, in which Figure 1 is a diagram of an arrangement of the invention for a gradual set and release of the brake, the brake band being in the set position, Figure 2 is a similar view, the brake band being in the release position, Figure 3 is a detail sectional perspective view of one of the fluid control valves, Figure 4 is a diagram of one arrangement of the invention for a quick release and graduated set of a brake, the brake being in the set position, Figure 5 is a similar view, the brake being in the release position.

By way of preface it may be said that the invention is applicable to a wide variety of apparatuses having electrical or other brakes, clutches or the like which require a controlling medium, and in view of the wide applicability of the invention it has been deemed expedient to avoid illustration thereof in connection with a particular apparatus, the simple showing of the brake drum 1 being regarded as sufficient for all purposes. The brake includes a band 2 of the external contracting type. The brake band has a lining 3 which bears upon the periphery of the drum.

One extremity of the brake band is anchored at 4 to a fixed standard 5, the anchoring point also constituting the pivotal point of a bell-crank 6, the short arm 7 of which is connected with the opposite extremity of the brake band. The bell crank includes the long arm 8.

As indicated in a foregoing brief statement, it is a purpose of the invention to apply and release the brake either gradually or quickly, and inasmuch as these functions involve slightly different arrangements, the construction in Figures 1 and 4 are described separately. The arrangement in Figures 1 and 2 may be known as the gradual control.

A link 9 or other suitable connector pivotally attached at 10 to the long arm 8 of the bell-crank 6, serves as the place of connection for the near ends of a pair of coiled springs 11 and 12 with the former of greater strength. The remote ends of the springs are respectively connected with one end of a lever 13 and with a ring bolt 14 in the floor. The foregoing remote end of the spring 11 is movable, while the remote end of the spring 12 is fixed. The springs can be put under tension by stretching with the spring 11 having the greater tension and when the stretching force subsides the springs return to a normal contracted condition.

The otherwise free extremity of the long arm 8 is pivotally connected at 15 with the rod 16 of a piston 17 which is operable in a cylinder 18. The cylinder contains a fluid F which preferably consists of oil. The cylinder is filled with oil, and the movement of the piston 17 within the cylinder depends upon the displacement of oil ahead of the piston in the direction of movement and obviously, if the passage of oil is prevented the movement of the piston 17 will be checked because the oil, like other liquids, is not compressible to any appreciable extent.

Passage of oil from one end of the cylinder to the other is primarily controlled by a valve 19 which is known as the primary valve. A detail of this valve is shown in Fig. 3. The piston of the valve has a central reduction which produces a pair of heads 20 and 21. These heads normally assume positions in the valve casing 22 covering the ports of conduits 23 and 24 which lead to the upper and lower ends of the fluid cylinder 18. The heads have notches 25 in the peripheries (Fig. 3) providing necessary openings for the passage of fluid when the primary valve moves from the closed (Fig. 1) to the open position (Fig. 2).

The stem 26 of the primary valve terminates in a hollow enlargement 27 which constitutes the movable core of a solenoid 28. A spring 29, seated in the hollow core, returns the primary valve to the open position when the magnetizing influence of the solenoid ceases. The solenoid is normally energized to keep the valve closed, and the valve opens only when required, as when the switch is opened or when there is an interruption in the power. The spring thereupon moves the valve down and opens quickly so as to permit setting the brake.

Control of the passage of fluid from one end to the other of the cylinder 18 is also had by a secondary or emergency valve 30. This valve and its operating solenoid 31 is the same in all respects to the valve 19, the only difference to be noted being the increased size of the conduits 32 and 33 which connect the valve casing 34 with the upper and lower ends of the cylinder 18. The primary valve 19 is used under all ordinary conditions, and it is only when an exceptionally quick action is desired as in an emergency, that use is made, additionally, of the secondary valve 30.

A standard 35 provides a pivotal support at 36 for the lever 13. The right extremity of this lever is pivotally connected at 37 with the core 38 of a relatively large solenoid 39. The standard 35 has a bracket 40 upon which the solenoid is conveniently mounted.

Current for the operation of the various solenoids is derived from a suitable source of energy as for example the battery B. A wire 41 from one terminal of the battery makes common connection with the single pole switches 42, 43 and 44. Wires 45, 46 and 47 connect the various switches with the solenoids 28, 31 and 39. The battery B has a common return or ground wire 47$^a$, while the various solenoids have common return or ground wires 48, 49 and 50.

Closure of the switch 42, for example, will conduct current from the battery B over wires 41 and 45 to the windings of the solenoids 28 whence it returns by way of the common return or ground wires 48 and 47$^a$ to the battery. The resulting energization of the solenoid will lift the primary valve 19 so that communication is cut off between the ends of the cylinder 18 and fluid is prevented from flowing. In this respect, attention is directed to the operation which, for the present, is confined to the gradual brake control. Assume that the brake has been set (Fig. 1). This condition is obtained by opening the switch 44 thereby deenergizing the solenoid 39 so that the lever 13 may freely rock upon its pivot 36. The switch 42 is closed in order to energize the solenoid 28 and normally close the primary valve 19 as previously stated. The spring 12 is holding the brake band 2 tight upon the drum 1, the piston 17 having moved downwardly in the cylinder 18 due to a previous opening of the primary valve 19. The valve 19 being closed, the fluid at the sides of the piston 17 acts as an abutment preventing motion of the piston in either direction regardless of what force might be applied to the lever 8.

Assume the brake to be released as in Figure 2, and a gradual set is desired. The switch 44 is opened. This opens the circuit of the solenoid 39 which, being deenergized, allows the lever 13 to rock counterclockwise. The tension of the spring 11 becomes slack and spring 12 having been stretched, now contracts pulling down upon arm 8 of the bellcrank 6 and upon the piston 17.

But in order that the piston may move, it is necessary to open switch 42. The resulting deenergization of the solenoid 28 permits opening of the valve 19 so that oil may gradually flow from bottom to top of the cylinder 18 thereby causing gradual application of the brake 2. The brake can be held in any position by again closing the switch 42.

Should the brake not act quickly enough switch 43 may be opened also, thereby allowing the valve 30 to open and permitting a rapid transfer of oil in the cylinder 18 and a correspondingly rapid downward movement of the brake arm 8. A break in the ground wire 47$^a$, either accidental or by means of a time limit switch (not shown) will have the result of an immediate application of the brake.

Assume the brake to be set as in Figure 1 and a gradual release to be desired. Close the switch 44. This energizes the solenoid 39 thereby putting the spring 11 under tension by virtue of the rocking of the lever 13 (Fig. 2). The resulting upward pull on the arm 8 tends to rock the bell-crank 6 and release the brake, but this is prevented by the oil abutment against the piston 17. By opening the switch 42 and thereby causing the opening of the valve 19, oil is permitted to gradually flow and the piston 17 moves upwardly slowly in the cylinder. The long arm moves accordingly, releasing the brake.

By a quick opening and closing movement of the switch 42 small portions of oil may be allowed to flow from bottom to top of the cylinder 18 so that gradual brake releasing motion of the lever 6 results. On the same principle the brake may be held at any given point and at any desired degree of application. A quick release is accomplished by closing both switches 42 and 43 thereby opening both valves 19 and 30.

Figure 2 illustrates the condition wherein the brake has been fully released. The switch 44 is closed to energize the solenoid 39. The spring 11 is under tension, as has already been stated. The switch 42 is open, and the primary valve 19 is opened as a result. The upward pressure on the bell-crank 6 causes the piston 17 to rise in the cylinder 18 so that oil flows from top to bottom through the open valve 19. Opening of the switch 44 and closing of the switch 42 will cause deenergization of the solenoid 39 and energization of the solenoid 28, in turn causing a relaxation of the spring 11 but nevertheless holding the brake in the released position because of the closure of the primary valve 19.

Reference is now made to Figures 4 and 5. Inasmuch as the major portion of the structure in Fig. 1 is employed for the quick control, it is thought desirable to avoid the unnecessary repetition of description, and simply designate similar parts by corresponding reference numerals. The parts that involve changes are briefly described thus: The link 9$^a$ now has direct connection with the core 38$^a$ of the solenoid 39$^a$, the intermediate lever 13 and spring 11, as in the gradual control form of the invention being omitted. Without entering into the other details with which the reader is already familiar, consideration may now be given to the operation of the quick control. Assume the brake to be set as in Fig. 4. A quick release is desired. A closure of the switch 44 energizes the solenoid 39$^a$ and applies a pull upon the long arm of the bell-crank 6. Switches 42 and 43 are both opened simultaneously, allowing oil to flow quickly from top to bottom of the cylinder 18 and also allowing the piston 17 to raise quickly, thereby insuring quick release of the brake as intended. At the same time that the switch 44 is again opened, both switches 42 and 43 must be closed, thereby holding the brake in the released position without expending energy at the solenoid 39$^a$.

A quick set of the brake is obtained by opening both switches 42 and 43 which causes deenergization of the solenoids 28 and 31 and permits the opening of both valves 19 and 30. The piston 17 may move downward rapidly under the influence of the spring 12, the solenoid 39$^a$ remaining deenergized by virtue of the still open switch 44. A graduated set is obtained in the manner heretofore described. A graduated release is not provided for in Figures 4 and 5, this particular mechanism being designed especially for a quick release thereby doing away with spring 11, lever arm 13, standard 35 and pivot bolt 36 (Figs. 1 and 2).

A delayed application of the brake may be performed by opening the switch 44 and closing and opening the switch 42 several times in rapid succession. This produces a succession of rapid openings and closures of the valve 19 so that the fluid has passage from bottom to top of the cylinder 18 at brief intervals only. Each closure of the primary valve 19 results in a checking of the piston 17 so that it is lowered by stages or steps, each step representing a more pronounced application of the brake. The brake is fully applied when the piston 17 reaches the position near the bottom of the cylinder.

In the latter respect the design of the cylinder 18 and the position of the cylinder ports of the various conduits is such that the piston never passes the ports. In respect to the piston of primary valve 19 the notch 25 in the upper head 20 only serves the purpose of permitting passage of fluid from the space above the piston when the valve is moved upwardly to the open position as in Figures 2 and 5. The valve casing 22 is filled with oil, and if no avenue for escape of the oil from the top of the piston were provided the required movement of the piston valve would be prevented.

While the construction and arrangement of the improved brake control is that of a generally preferred form, obviously modifications and changes may be made without departing from the spirit of the invention or the scope of the claims.

I claim:—

1. In combination with a brake having an actuating member, means connected therewith normally tending to move said member in one brake operating direction, electromagnetic means having connection with said actuating member for operating the member in a reverse direction, a fluid cylinder having a piston in operative connection with said actuating member, and other electromagnetic means selectively operable variably to control the passage of fluid from one end to the other of the cylinder thereby variably regulating the operating force of said actuating member.

2. In combination with a brake band, an anchorage for one end of the brake band, a bell-crank lever having operative connection adjacent to one end with the other end of the brake, resilient means exerting pressure upon the lever to set the brake, means operable in opposition to said resilient means to release the brake, a piston connected with the lever, a fluid cylinder in which the piston is movable in one direction under the influence of said resilient means, and a valve for controlling the passage of fluid from one side to the other of the piston.

3. In combination with a brake, a lever for operating the brake, a spring exerting a force upon the lever in one direction, electro-magnetic means exerting a predominating force upon the lever in the other direction, said forces performing setting and releasing functions, a piston connected with the lever, a fluid cylinder in which the piston is movable, a main valve for controlling the passage of fluid from one end to the other of the cylinder, said valve normally being closed, electromagnetic means for opening the valve, and a switch mechanism for energizing said last electro-magnetic means and opening the valve at will permitting movement of the piston in either direction.

4. The combination of a brake, a lever for operating the brake, means applying a force to the lever for moving it in one direction to set the brake, means applying an opposing predominating force to move the lever in the opposite direction to release the brake, and a plurality of electro-magnetically controlled retarding means operable at will variably to retard movements of the lever when either the first or the predominating force is in the act of performing its respective function.

5. The combination of a brake, a lever for operating the brake, a spring attached to the lever tending to move it in one direction for setting the brake, a piston attached to the lever, a fluid cylinder in which the piston is movable in one direction under the influence of the spring in the setting operation, a solenoid having a movable core attached to the lever, means to energize the solenoid overcoming said spring to release the brake and move the piston in the opposite direction, a main control valve in normally closed position to prevent passage of fluid from end to end of the cylinder and effective to maintain the piston stationary regardless of either force applied to the lever, and electro-magnetic means normally holding said valve in normally closed position including a switch to be opened for deenergization of said means permitting opening of the valve at will for the passage of fluid and permitting movement of the piston in a direction agreeing with the predominating lever-moving force thereby to either set or release the brake.

FRANK L. JOHNSTON.